United States Patent [19]

Van Landuyt et al.

[11] 3,765,965

[45] Oct. 16, 1973

[54] COMPOSITE PROPELLANT COMPOSITION WITH FERROCENE COMPOUND AS BONDING AGENT AND BALLISTIC MODIFIER

[75] Inventors: Dennis C. Van Landuyt, Auburn; Orval E. Ayers, Huntsville, both of Ala.

[73] Assignee: The United States of America as represented by the Secretary of the Army, Washington, D.C.

[22] Filed: July 12, 1972

[21] Appl. No.: 270,798

Related U.S. Application Data

[62] Division of Ser. No. 155,672, June 15, 1971.

[52] U.S. Cl............................ 149/7, 149/19, 149/44, 149/76
[51] Int. Cl................................................ C06d 5/06
[58] Field of Search ..................... 149/7, 19, 44, 76

[56] References Cited

UNITED STATES PATENTS

| | | | |
|---|---|---|---|
| 3,447,981 | 6/1969 | Sayles | 149/44 X |
| 3,666,575 | 5/1972 | Fisher | 149/19 |

OTHER PUBLICATIONS

Bieber et al., J. Org. Chem., 29 (7), 2028–2030 (1964) QD 241 J6.

*Primary Examiner*—Carl D. Quarforth
*Assistant Examiner*—E. A. Miller
*Attorney*—Harry M. Saragovitz et al.

[57] ABSTRACT

The compound 1-pyrrolidinyl-methylferrocene in composite propellant compositions containing a binder, an oxidizer and a metallic fuel and as a coating agent for ammonium perchlorate.

5 Claims, No Drawings

COMPOSITE PROPELLANT COMPOSITION WITH FERROCENE COMPOUND AS BONDING AGENT AND BALLISTIC MODIFIER

CROSS REFERENCE TO RELATED APPLICATION

This application is a division of application Ser. No. 155,672, filed June 15, 1971.

BACKGROUND OF THE INVENTION

Ferrocenes are usually used in the liquid form as ballistic modifiers in solid propellant compositions and they also serve as plasticizing agents. In the liquid stage, some ferrocene additives exhibit inherent disadvantages that are characteristic of liquid additives such as loss by evaporation, migration, etc., and consequently, propellant systems often suffer when stored for long periods of time. Therefore, there is a great need for perfecting ferrocene compounds for use in solid propellant compositions as ballistic modifiers, bonding agents, and processing aids to improve the mechanical properties of propellant compositions.

Accordingly, it is an object of this invention to provide the compound 1-pyrrolidinyl-methylferrocene as a coating agent for ammonium perchlorate, which coating also acts as a bonding agent.

Another object of this invention is to provide the compound 1-pyrrolidinyl-methylferrocene as a processing aid, bonding agent, and ballistic modifier in composite propellant compositions to improve the mechanical properties thereof.

A further object of this invention is to provide the compound 1-pyrrolidinyl-methylferrocene for use in solid propellant compositions to vary the burning rates of various solid propellants.

SUMMARY OF THE INVENTION

In accordance with this invention, the novel compound 1-pyrrolidinyl-methylferrocene is produced by reacting (ferrocenylmethyl) trimethyl ammonium iodide or dimethylaminomethylferrocene methyliodide, aqueous sodium hydroxide solution and pyrrolidine in a mechnically stirred mixture and at a reflux temperature for about 6 hours. The reaction product yields 1-pyrrolidinyl-methylferrocene. This product can then be used as a bonding agent to coat the surface of the oxidizer. Coating of an oxidizer such as ammonium perchlorate is accomplished by dissolving the product in methylene chloride and then adding this solution to a quantity of ammonium perchlorate. The mixed solution is allowed to stand overnight to insure complete coating of the ammonium perchlorate. The ammonium perchlorate coated with the compound 1-pyrrolidinyl-methylferrocene is incorporated in propellant compositions that contain other ingredients such as a binder, curing agents, metal fuel, and processing aids as desired. Propellant compositions using the compound 1-pyrrolidinyl-methylferrocene in quantities of 5 to 10 weight percent can have the burning rates thereof increased to more than 200 percent in comparison to propellant compositions without the novel compound.

DETAILED DESCRIPTION OF THE INVENTION

Synthesis of 1-pyrrolidinyl-methylferrocene. In a 500 ml round-bottom flask equipped with mechanical stirrer and reflux condenser, the following reactants were placed: 150 g(0.39 mole) dimethylaminomethylferrocene methyliodide or (ferrocenylmethyl) trimethyl ammonium iodide, 120 ml of 1 molar aqueous sodium hydroxide solution, 100 ml (1.20 moles) of pyrrolidine. This mixture was mechanically stirred and maintained at reflux temperature for 6 hours, and then the reaction product was extracted with a 50—50 volume solution of benzene and heptane (450 ml required). The organic solution was dried over anhydrous $MgSO_4$ and evaporated. Yield 76.3 grams (0.29 moles) of 1-pyrrolidinyl-methylferrocene. The structure of this compound was confirmed by N.M.R. and I.R. spectra. Melting point of this solid was found to be 50—50.5° C.

As a bonding agent, the compound, 1-pyrrolidinyl-methylferrocene, is coated on the surface of an oxidizer, preferably ammonium perchlorate using 0.2 percent or more coating. Coating of the oxidizer surface is accomplished by dissolving the 1-pyrrolidinyl-methylferrocene in methylene chloride and then adding this solution to a quantity of oxidizer. After thoroughly mixing, the solution is allowed to stand overnight to insure complete coating of the oxidizer. The amount of compound necessary to coat the oxidizer will depend upon the total oxidizer surface area. Propellants are processed using the 1-pyrrolidinylmethyl-ferrocene coated oxidizer. The bonding agent for the oxidizer acts as a processing aid, bonding agent, and ballistic modifier for the propellant composition, and improves the mechanical properties of composite propellants.

Basically, propellant compositions according to this invention comprise a binder of about 10 to about 25 weight percent, a metal fuel of about 5 to about 20 weight percent, an oxidizer of about 50 to about 75 weight percent, and 1-pyrrolidinyl-methylferrocene of an amount of about 0.1 to about 20 weight percent and preferably from about 0.2 to about 10 weight percent. Also, depending upon the particular propellant composition, small amounts of conventional curing agents and conventional processing aids may be used as necessary to accomplish the desired mixing and curing of the propellant compositions.

Binders according to this invention may be selected from carboxy terminated polybutadiene, hydroxy terminated polybutadiene, polybutadiene acrylic acid, and other hydro carbon binders.

Metal fuels useful in this invention include metal powders as additives in the propellant compositions according to the invention. These metal additives include in addition to the preferred metal powder aluminum, magnesium, titanium, zirconium, and boron. Alloys and mixtures of the aforesaid metals may also be employed.

Inorganic oxidizing salts which are useful in the solid propellant compositions of this invention are those oxygen containing salts which readily give up oxygen. Even though other oxidizing salts may be used with the propellant compositions of this invention, ammonium perchlorate is preferred with the propellant compositions since 1-pyrrolidinylmethylferrocene acts as a binder coating for ammonium perchlorate. Further, ammonium perchlorate is preferred since less smoke results from lower solids present in exhaust gases from a rocket motor wherein ammonium perchlorate is used. Lower smoke solids are required for military purposes of concealment. Further, ammonium perchlorate is preferred since it is available in large as well as small particle sizes.

Examples of composite propellant compositions according to this invention:

EXAMPLE I

| | % by Weight |
|---|---|
| Carboxy terminated polybutadiene | 17.81 |
| Tris [1-(2-methyl)aziridinyl]phosphine oxide | 0.56 |
| ERLA* 0510 | 0.18 |
| Aluminum (H-10) | 10.00 |
| 1-pyrrolidinyl-methylferrocene | 5.00 |
| Ammonium Perchlorate (15 micron) | 66.45 |
| Lecithin (added) | 0.20 |

*Trifunctional epoxide produced by Shell Chemical Corporation

This propellant composition gave a burning rate of 0.99 in/sec at 2000 psia. A control composition similar to the above containing no catalyst gave a burning rate of 0.5 in/sec.

EXAMPLE II

| | % by Weight |
|---|---|
| Carboxy terminated polybutadiene | 16.13 |
| Tris [1-(2-methyl)aziridinyl]phosphine oxide | .51 |
| ERLA 0510 | .16 |
| Aluminum (H-10) | 13.00 |
| Ammonium perchlorate (200 micron) | 21.00 |
| Ammonium perchlorate (17 micron) | 49.00 |
| 1-pyrrolidinyl-methylferrocene | 0.20 |

We claim:

1. A solid propellant composition comprising 1-pyrrolidinyl-methylferrocene present in an amount of 0.1 to about 20 weight percent, a binder in an amount of about 10 to about 25 weight percent, an oxygen oxidizer in an amount of about 50 to about 75 weight percent and a metal fuel in an amount of about 5 to about 20 weight percent.

2. The composition of claim 1, wherein said binder is carboxy terminated polybutadiene, wherein said oxidizer is ammonium perchlorate, and wherein said metal fuel is aluminum.

3. The composition of claim 1, wherein said binder is carboxy terminated polybutadiene present in an amount of about 17 to 18 weight percent, wherein said oxidizer is ammonium perchlorate present in an amount of about 66 to 67 weight percent, wherein said 1-pyrrolidinylmethylferrocene is present in an amount of about 5 weight percent, wherein said metal fuel is aluminum present in an amount of about 10 weight percent, and wherein said composition further comprises a trifunctional epoxide, tris[1-(2-methyl)aziridinyl]phosphine oxide, and lecithin, said trifunctional epoxide being present in an amount of about 0.18 weight percent, said tris[1-(2-methyl)aziridinyl]phosphine oxide being present in an amount of 0.56 weight percent, and wherein said lecithin has been added in an amount of about 0.2 weight percent of the other propellant ingredients.

4. The composition of claim 1, wherein said binder is carboxy terminated polybutadiene present in an amount of about 16 to 17 weight percent, wherein said oxidizer is ammonium perchlorate present in an amount of about 21 weight percent of 200 micron size and about 49 weight percent of 17 micron size, wherein said metal fuel is aluminum present in an amount of about 13 weight percent, wherein said 1-pyrrolidinylmethylferrocene is present in an amount of about 0.20 weight percent, and wherein said propellant composition further comprises a trifunctional epoxide and tris[1-(2-methyl)aziridinyl]phosphine oxide, said trifunctional epoxide being present in an amount of about 0.16 weight percent, and said tris[1-(2-methyl)aziridinly]phosphine oxide being present in an amount of about 0.51 weight percent.

5. The composition comprising the compound 1-pyrrolidinyl-methylferrocene dissolved in methylene chloride and then mixed with ammonium perchlorate to form a coating of said compound on the surface of said ammonium perchlorate.

* * * * *